(12) United States Patent
Pisklak et al.

(10) Patent No.: US 12,037,536 B2
(45) Date of Patent: Jul. 16, 2024

(54) MITIGATING ANNULAR PRESSURE BUILDUP WITH NANOPOROUS METAL OXIDES

(71) Applicant: Halliburton Energy Services, Inc., Houston, TX (US)

(72) Inventors: Thomas J. Pisklak, Cypress, TX (US); Samuel J. Lewis, The Woodlands, TX (US); William C. Pearl, Jr., Spring, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 899 days.

(21) Appl. No.: 16/975,328

(22) PCT Filed: May 30, 2018

(86) PCT No.: PCT/US2018/035182
§ 371 (c)(1),
(2) Date: Aug. 24, 2020

(87) PCT Pub. No.: WO2019/194846
PCT Pub. Date: Oct. 10, 2019

(65) Prior Publication Data
US 2020/0399524 A1    Dec. 24, 2020

Related U.S. Application Data

(60) Provisional application No. 62/653,346, filed on Apr. 5, 2018.

(51) Int. Cl.
*C09K 8/40* (2006.01)
*B01J 20/22* (2006.01)
(Continued)

(52) U.S. Cl.
CPC .............. *C09K 8/40* (2013.01); *B01J 20/226* (2013.01); *B01J 35/643* (2024.01); *C09K 8/592* (2013.01);
(Continued)

(58) Field of Classification Search
CPC ........ E21B 43/16; E21B 43/267; E21B 21/00; E21B 37/00
See application file for complete search history.

(56) References Cited

U.S. PATENT DOCUMENTS 7,096,944 B2    8/2006  Vargo, Jr. et al.
7,147,067 B2 *  12/2006 Getzlaf ................ C04B 28/008
                                                          507/140
(Continued)

FOREIGN PATENT DOCUMENTS

WO    2017-039616 A1    3/2017

OTHER PUBLICATIONS

Jha, et al. "Basics of Zeolites", Fly Ash Zeolites, Advanced Structured Materials 78, Chapter 2, 2016, pp. 5-31.
(Continued)

*Primary Examiner* — Zakiya W Bates
(74) *Attorney, Agent, or Firm* — Barnes & Thornburg LLP

(57) ABSTRACT

Methods and systems for mitigating annular pressure buildup in a wellbore. An example method introduces a treatment fluid into an annulus of the wellbore, wherein the annulus has an annular pressure, and wherein the treatment fluid comprises an aqueous base fluid and a nanoporous metal oxide. The method further includes allowing or causing to allow at least a portion of the treatment fluid to remain in the annulus; and allowing or causing to allow the annular pressure to increase thereby inducing at least a portion of the aqueous base fluid to enter into an interior volume of the nanoporous metal oxide.

20 Claims, 4 Drawing Sheets

(51) Int. Cl.
    *B01J 35/64* (2024.01)
    *B82Y 30/00* (2011.01)
    *B82Y 40/00* (2011.01)
    *C09K 8/592* (2006.01)
    *E21B 21/00* (2006.01)

(52) U.S. Cl.
    CPC ............... *B82Y 30/00* (2013.01); *B82Y 40/00* (2013.01); *C09K 2208/10* (2013.01)

(56) References Cited

U.S. PATENT DOCUMENTS

| | | | |
|---|---|---|---|
| 2013/0017980 A1 | 1/2013 | Williams et al. | |
| 2013/0112405 A1* | 5/2013 | Chatterji | C09K 8/48 |
| | | | 507/221 |
| 2013/0331268 A1* | 12/2013 | Elliott | C08G 65/331 |
| | | | 525/472 |
| 2015/0217229 A1* | 8/2015 | Yin | B01J 29/04 |
| | | | 502/332 |
| 2017/0247983 A1 | 8/2017 | Funkhouser et al. | |
| 2017/0350225 A1 | 12/2017 | Benoit et al. | |

OTHER PUBLICATIONS

Han, et al. "High-pressure cation-exchange treatment of a ZSM-5 zeolite", J. Mater. Res., vol. 24, No. 7, Jul. 2009, pp. 2416-2419.

Humplik, et al. "Framework water capacity and infiltration pressure of MFI zeolites", Microporous and Mesoporous Materials, 190, pp. 84-91, 2014.

International Search Report and Written Opinion mailed Apr. 12, 2019; International PCT Application No. PCT/US2018/035182.

Khan, et al. "Preparation of b-Oriented Silicate-1/Zeolite A Composite Membrane", Proceedings of 2nd International Conference on Chemical Engineering 2008, pp. 155-159.

* cited by examiner

MITIGATING ANNULAR PRESSURE BUILDUP WITH NANOPOROUS METAL OXIDES

TECHNICAL FIELD

The present disclosure relates to the use of nanoporous metal oxides for mitigating annular pressure buildup, and more particularly, to treatment fluids comprising nanoporous metal oxides that absorb and desorb fluid to repeatedly mitigate annular pressure buildup.

BACKGROUND

During production, oil and gas is transported through the wellbore. The oil and gas transfers heat through the casing and into the annulus. This heat transfer may increase the annular pressure due to, amongst other reasons, the thermal expansion of fluids trapped in the annular space. Examples of these trapped fluids may include portions of drilling fluids or spacer fluids that were not sufficiently displaced from the annulus. In some wells, such as geothermal wells and/or steam-cycled wells, multiple heating and cooling cycles may be performed to enhance recovery. Fluid that is trapped in the annulus may thermally expand in these wells leading to an increase in annular pressure. This increase in annular pressure is known as annular pressure buildup, and may be more pronounced in annuli where the annular volume is fixed, for instance, in deep water wells where the annulus may be closed or any other well where fluid may become trapped in the annulus, e.g., in some shut-in wells. Annular pressure buildup may cause damage to the cement sheath, the casing, tubulars, and any other equipment exposed to the increased annular pressure.

Current methods used in the field for mitigating annular pressure buildup include the use of a syntactic foam wrapping on the casing, the installation of vacuum insulated tubing to limit heat transfer, the placing of nitrified spacer fluids above the cement in the annulus, the placing of rupture disks in an outer casing string, the use of intentional "shortfalls" in the primary cementing operation such as designing the top of the cement column in an annulus to be short of the previous casing shoe, and the use of hollow glass beads to reduce fluid volume when crushed from the increasing pressure. These methods may have drawbacks in some applications. As such, the inability to mitigate or relieve annular pressure buildup can result in damage to the well equipment and the wellbore, potentially resulting in a loss of operational time and resources.

BRIEF DESCRIPTION OF THE DRAWINGS

Illustrative examples of the present disclosure are described in detail below with reference to the attached drawing figures, which are incorporated by reference herein, and wherein.

Figure 1:
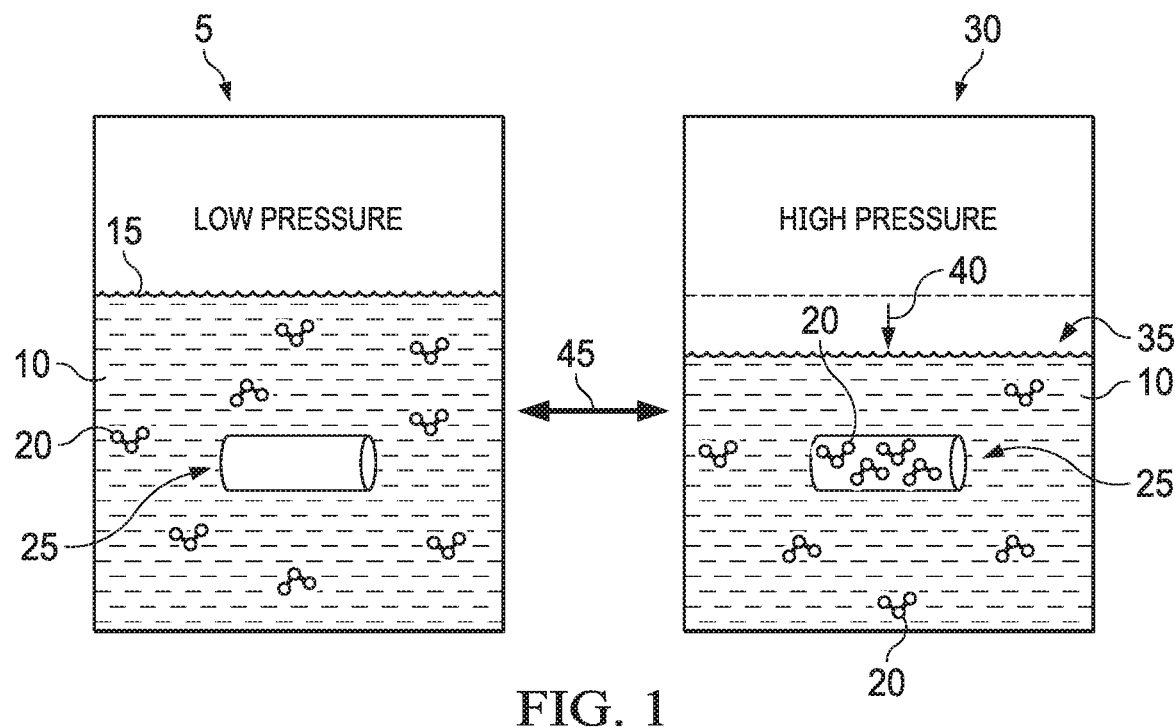
FIG. 1 is a schematic illustrating how low and high annular pressure affects fluid volume of an example treatment fluid in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of nanoporous metal oxides for mitigating annular pressure buildup, and more particularly, to treatment fluids comprising nanoporous metal oxides that absorb and desorb fluid to repeatedly mitigate annular pressure buildup. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Treatment fluids can be employed in a variety of subterranean operations. As used herein, the terms "treatment," "treating," and other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Example treatment fluids may include, for example, spacer fluids, drilling fluids, fracturing fluids, cements, workover fluids, completion fluids, and the like.

Examples of the methods and systems described herein relate to the use of treatment fluids comprising nanoporous metal oxides. The nanoporous metal oxides may be used to reduce the annular pressure buildup in treatment fluids. One of the many potential advantages to these methods and systems is that the nanoporous metal oxides reversibly absorb and desorb fluid from the treatment fluid. As such, the nanoporous metal oxides may be used to mitigate annular pressure buildup in wells that undergo cyclic heating or wells requiring remedial work. Another potential advantage of these methods and systems is that the nanoporous metal oxides are easily dispersed, inorganic, insoluble, and non-hazardous and thus may be tailored to specific treatment fluid compositions with little to no deleterious effects or impact on fluid design. Yet a further advantage is that the nanoporous metal oxides may be used in a wide variety of treatment fluid environments and may be used in treatment fluids comprising brines or oils. Yet another potential advantage is that the nanoporous metal oxides are relatively inexpensive additives thus providing a cost-effective treatment fluid solution for annular pressure buildup.

FIG. 1 is a schematic illustrating the reversible method disclosed herein. In a low-pressure system, generally 5, a treatment fluid 10 disposed within a closed or partially restricted annulus may have a low-pressure fluid volume indicated by arrow 15. At low pressure, water molecules 20 may reside in the treatment fluid 10 and be disposed outside of the interior volume of a nanoporous metal oxide 25. Without limitation, the water molecules 20 reside outside of the interior volume of the nanoporous metal oxide 25 due to the Gibbs free energy needed to move the water molecules 20 into the interior volume of the nanoporous metal oxide 25 and the relatively hydrophobic surface of the interior volume of the framework of nanoporous metal oxide 25. As the pressure of the low-pressure system 5 increases, these factors may be overcome, and the water molecules 20 may enter into the interior volume of the nanoporous metal oxide 25.

With continued reference to FIG. 1, as annular pressure builds, the low-pressure system 5 reversibly shifts to the high-pressure system, generally 30. At high pressure, treatment fluid 10 may have a high-pressure fluid volume 35 indicated by arrow 35. The difference between the low-pressure fluid volume 15 and the high-pressure fluid volume 35 is indicated by arrow 40 that illustrates that the high-pressure fluid volume 35 is reduced relative to the low-pressure fluid volume 15. This reduction in overall fluid volume occurs because a portion of the water molecules 20 have entered the nanoporous metal oxide 25 interior volume at the increased pressure. This process is reversible as indicated by arrow 45, and when annular pressure decreases, the water molecules 20 may exit the interior volume of the nanoporous metal oxide 25 reverting the system back to the low-pressure system 5 iteration. As the annular pressure cycles between high and low pressures, the fluid volume shifts between the levels indicated in the low-pressure system 5 and the high-pressure system 30. As such, the nanoporous metal oxide 25 may repeatedly mitigate annular pressure buildup without the need for remedial action or further alteration of the treatment fluid 10.

The nanoporous metal oxide comprises an inorganic framework having regular pores of 1000 nm or less. The International Union of Pure and Applied Chemistry (hereafter "IUPAC") subdivides nanoporous materials into three classes based on pore size. Microporous materials comprise a pore size of about 0.2 to about 2 nm. Mesoporous materials comprise a pore size of about 2 to about 50 nm. Macroporous materials comprise a pore size of about 50 to about 1000 nm. The nanoporous metal oxide as disclosed herein may comprise any pore size or range of pore sizes between about 0.2 nm to about 1000 nm. The pore size may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the pore size of the nanoporous metal oxide may range from about 0.2 nm to about 1000 nm, from about 0.5 nm to about 1000 nm, from about 1 nm to about 1000 nm, from about 5 nm to about 1000 nm, from about 10 nm to about 1000 nm, from about 20 nm to about 1000 nm, from about 30 nm to about 1000 nm, from about 40 nm to about 1000 nm, from about 50 nm to about 1000 nm, from about 60 nm to about 1000 nm, from about 70 nm to about 1000 nm, from about 80 nm to about 1000 nm, from about 90 nm to about 1000 nm, from about 100 nm to about 1000 nm, from about 200 nm to about 1000 nm, from about 300 nm to about 1000 nm, from about 400 nm to about 1000 nm, from about 500 nm to about 1000 nm, from about 600 nm to about 1000 nm, from about 700 nm to about 1000 nm, from about 800 nm to about 1000 nm, or from about 900 nm to about 1000 nm. As another example, the pore size of the nanoporous metal oxide may range from about 0.2 nm to about 1000 nm, from about 0.2 nm to about 900 nm, from about 0.2 nm to about 800 nm, from about 0.2 nm to about 700 nm, from about 0.2 nm to about 600 nm, from about 0.2 nm to about 500 nm, from about 0.2 nm to about 400 nm, from about 0.2 nm to about 300 nm, from about 0.2 nm to about 200 nm, from about 0.2 nm to about 100 nm, from about 0.2 nm to about 90 nm, from about 0.2 nm to about 80 nm, from about 0.2 nm to about 70 nm, from about 0.2 nm to about 60 nm, from about 0.2 nm to about 50 nm, from about 0.2 nm to about 40 nm, from about 0.2 nm to about 30 nm, from about 0.2 nm to about 20 nm, from about 0.2 nm to about 10 nm, from about 0.2 nm to about 5 nm, from about 0.2 nm to about 1 nm, or from about 0.2 nm to about 0.5 nm. It is to be understood that the above ranges encompass every range or subset of ranges in-between. With the benefit of this disclosure, one of ordinary skill in the art will be readily able to obtain and prepare a treatment fluid comprising a nanoporous metal oxide with appropriate pore size for a given application.

The nanoporous metal oxide comprises an interior volume. The total amount of fluid which may be absorbed by the nanoporous metal oxide is a factor of both the interior volume of the nanoporous metal oxides in the treatment fluid and the total concentration of the nanoporous metal oxides in the treatment fluid. Nanoporous metal oxides having larger interior volumes may absorb more water than nanoporous metal oxides having smaller interior volumes. The nanoporous metal oxides are tailorable for a given application, and with the benefit of this disclosure, one of ordinary skill in the art may be readily able to produce or select a nanoporous metal oxide having a sufficient interior volume for a given application.

The concentration of the nanoporous metal oxide within the treatment fluid may range from about 0.01 wt. % to about 20 wt. %. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the nanoporous metal oxide may range from about 0.01 wt. % to about 20 wt. %, from about 0.02 wt. % to about 20 wt. %, from about 0.03 wt. % to about 20 wt. %, from about 0.04 wt. % to about 20 wt. %, from about 0.05 wt. % to about 20 wt. %, from about 0.06 wt. % to about 20 wt. %, from about 0.07 wt. % to about 20 wt. %, from about 0.8 wt. % to about 20 wt. %, from about 0.09 wt. % to about 20 wt. %, from about 0.1 wt. % to about 20 wt. %, from about 0.2 wt. % to about 20 wt. %, from about 0.3 wt. % to about 20 wt. %, from about 0.4 wt.

% to about 20 wt. %, from about 0.5 wt. % to about 20 wt. %, from about 0.6 wt. % to about 20 wt. %, from about 0.7 wt. % to about 20 wt. %, from about 0.8 wt. % to about 20 wt. %, from about 0.9 wt. % to about 20 wt. %, from about 1 wt. % to about 20 wt. %, from about 2 wt. % to about 20 wt. %, from about 3 wt. % to about 20 wt. %, from about 4 wt. % to about 20 wt. %, from about 5 wt. % to about 20 wt. %, from about 6 wt. % to about 20 wt. %, from about 7 wt. % to about 20 wt. %, from about 8 wt. % to about 20 wt. %, from about 9 wt. % to about 20 wt. %, from about 10 wt. % to about 20 wt. %, from about 11 wt. % to about 20 wt. %, from about 12 wt. % to about 20 wt. %, from about 13 wt. % to about 20 wt. %, from about 14 wt. % to about 20 wt. %, from about 15 wt. % to about 20 wt. %, from about 16 wt. % to about 20 wt. %, from about 17 wt. % to about 20 wt. %, from about 18 wt. % to about 20 wt. %, or from about 19 wt. % to about 20 wt. %. As another example, the concentration of the nanoporous metal oxide may range from about 0.01 wt. % to about 20 wt. %, from about 0.01 wt. % to about 19 wt. %, from about 0.01 wt. % to about 18 wt. %, from about 0.01 wt. % to about 17 wt. %, from about 0.01 wt. % to about 16 wt. %, from about 0.01 wt. % to about 15 wt. %, from about 0.01 wt. % to about 14 wt. %, from about 0.01 wt. % to about 13 wt. %, from about 0.01 wt. % to about 12 wt. %, from about 0.01 wt. % to about 11 wt. %, from about 0.01 wt. % to about 10 wt. %, from about 0.01 wt. % to about 9 wt. %, from about 0.01 wt. % to about 8 wt. %, from about 0.01 wt. % to about 7 wt. %, from about 0.01 wt. % to about 6 wt. %, from about 0.01 wt. % to about 5 wt. %, from about 0.01 wt. % to about 4 wt. %, from about 0.01 wt. % to about 3 wt. %, from about 0.01 wt. % to about 2 wt. %, from about 0.01 wt. % to about 1 wt. %, from about 0.01 wt. % to about 0.9 wt. %, from about 0.01 wt. % to about 0.8 wt. %, from about 0.01 wt. % to about 0.7 wt. %, from about 0.01 wt. % to about 0.6 wt. %, from about 0.01 wt. % to about 0.5 wt. %, from about 0.01 wt. % to about 0.4 wt. %, from about 0.01 wt. % to about 0.3 wt. %, from about 0.01 wt. % to about 0.2 wt. %, from about 0.01 wt. % to about 0.1 wt. %, from about 0.01 wt. % to about 0.09 wt. %, from about 0.01 wt. % to about 0.08 wt. %, from about 0.01 wt. % to about 0.07 wt. %, from about 0.01 wt. % to about 0.06 wt. %, from about 0.01 wt. % to about 0.05 wt. %, from about 0.01 wt. % to about 0.04 wt. %, from about 0.01 wt. % to about 0.03 wt. %, or from about 0.01 wt. % to about 0.02 wt. %. With the benefit of this disclosure, one of ordinary skill in the art will be readily able to obtain and prepare a treatment fluid comprising a nanoporous metal oxide having a sufficient concentration for a given application.

Examples of the nanoporous metal oxides include, but are not limited to, zeolites. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite. A commercial example of a suitable source of zeolite is Valfor-100® zeolite or Advera® 401 zeolite available from the PQ Corporation, Malvern, Pa. Zeolites are classified by framework type and each framework type is provided a three-letter designation. Examples of zeolites may include, but are not limited to, MFI framework: pentasil, ZSM-5 (both high and low alumina framework variants); Faujasite framework (FAU): faujasite-series, Linde type X (zeolite X, X zeolites), Linde type Y (zeolite Y, Y zeolites); Linde type A framework (LTA): zeolite A; Natrolite framework (NAT): gonnardite, natrolite, mesolite, paranatrolite, scolecite, tetranatrolite; Edingtonite framework (EDI): edingtonite, kalborsite; Thomsonite framework (THO): thomsonite-series; Analcime framework (ANA): analcime, leucite, pollucite, wairakite; Laumontite (LAU); yugawaralite (YUG); goosecreekite (GOO); montesommaite (MON); Phillipsite framework (PHI): harmotome, phillipsite-series; Gismondine framework (GIS): amicite, gismondine, garronite, gobbinsite; Boggsite (BOG); merlinoite (MER); mazzite-series (MAZ); paulingite-series (PAU); perlialite (Linde type L framework, zeolite L, LTL); Chabazite framework (CHA): chabazite-series, herschelite, willhendersonite and SSZ-13; Mordenite framework (MOR): maricopaite, mordenite; Offretite-wenkite subgroup 09.GD.25 (Nickel-Strunz, 10 ed): offretite (OFF), wenkite (WEN); Bellbergite (TMA-E, Aiello and Barrer; framework type EAB); bikitaite (BIK); erionite-series (ERI); ferrierite (FER); gmelinite (GME); levyne-series (LEV); dachiardite-series (DAC); epistilbite (EPI); Heulandite framework (HEU): clinoptilolite, heulandite-series; Stilbite framework (STD: barrerite, stellerite, stilbite-series; Brewsterite framework (BRE): brewsterite-series; the like; or any combination thereof.

Furthermore, embodiments comprising a zeolite may comprise a zeolite in combination with a cation such as Na+, K+, Ca2+, Mg2+, etc. An example of a zeolite comprising a cation (e.g., Na+) is the afore-mentioned Valfor® 100 zeolite.

Examples of nanoporous metal oxides may also include, but are not limited to, metal organic coordination polymers, and more specifically, metal organic frameworks. Metal organic frameworks are coordination networks with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally, a coordination polymer is a coordination compound with repeating coordination entities extending in one, two, or three dimensions. Examples of metal organic frameworks include, but are not limited to, $Zn_4O(BTE)(BPDC)$ (hereafter referred to as "MOF-210"), where $BTE^{3-}$=4,4',4"-[benzene-1,3,5-triyl-tris(ethyne-2,1-diyl)]tribenzoate and $BPDC^{2-}$=biphenyl-4,4'-dicarboxylate; $Zn_4O(BBC)_2$ (hereafter referred to as "MOF 200"), where $BBC^{3-}$=4,4',4"-[benzene-1,3,5-triyl-tris(benzene-4,1-diyl)]tribenzoate; $Zn_4O(BTB)_2$ (hereafter referred to as "MOF-177"), where $BTB^{3-}$=1,3,5-benzenetribenzoate; $Zn_4O(BDC)_3$ (hereafter referred to as "MOF-5"), where $BDC^{2-}$=1,4-benzenedicarboxylate; $Cu_3(BTC)_2(H_2O)_3$ (hereafter referred to as "HKUST-1"), where $H_3BTC$=1,3,5-benzenetricarboxylic acid; the like; or any combination thereof.

It is to be understood that the nanoporous metal oxide used in the treatment fluid may include a single species of nanoporous metal oxide or multiple species of nanoporous metal oxides. Any type of nanoporous metal oxide may be present in the treatment fluid in combination with any other type of nanoporous metal oxide in any concentration as described herein.

The treatment fluids described herein comprise an aqueous base fluid, for example, freshwater, saltwater (e.g., water containing one or more salts dissolved therein), brine (e.g., saturated saltwater produced from subterranean formations), seawater, or any combination thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous base fluid for a chosen application.

A wide variety of additional additives may be included in the treatment fluids as deemed appropriate by one skilled in the art, with the benefit of this disclosure. Examples of such additives include, but are not limited to: cementitious materials, weighting agents, viscosifying agents (e.g., clays, hydratable polymers, guar gum), fluid loss control additives, lost circulation materials, filtration control additives, dispersants, foaming additives, defoaming additives, corrosion inhibitors, scale inhibitors, formation conditioning agents, and water-wetting surfactants. Examples of suitable weighting agents include, for example, materials having a specific gravity of 2 or greater, such as barite. Specific examples of these, and other additives include: organic polymers, biopolymers, latex, ground rubber, surfactants, crystalline silica, amorphous silica, silica flour, fumed silica, nanoclays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, Portland cement, Portland cement interground with pumice, perlite, barite, slag, lime (e.g., hydrated lime), gypsum, and any combinations thereof, and the like. A person having ordinary skill in the art, with the benefit of this disclosure, should be readily able to determine the type and amount of additive useful for a particular application and desired result.

The treatment fluids generally should have a density suitable for a particular application as desired by those of ordinary skill in the art, with the benefit of this disclosure. In some examples, the treatment fluids may have a density in the range of from about 4 pounds per gallon (hereafter "ppg") to about 24 ppg. In other examples, the treatment fluids may have a density in the range of about 4 ppg to about 17 ppg. In yet other examples, the treatment fluids may have a density in the range of about 8 ppg to about 13 ppg. Examples of the treatment fluids may be foamed or unfoamed or comprise other means to reduce their densities known in the art, such as lightweight additives. Those of ordinary skill in the art, with the benefit of this disclosure, should recognize the appropriate density for a particular application and be readily able to produce a treatment fluid having a desired density.

Example systems may comprise a pump fluidly coupled to a tubular, the tubular containing an example treatment fluid as described herein. The pump may be a high-pressure pump or a low-pressure pump. As used herein, the term "high pressure pump" will refer to a pump that is capable of delivering a treatment fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank to the transporting conduit. In other examples, the treatment fluid may be formulated offsite and transported to a worksite, in which case the treatment fluid may be introduced to the transporting conduit via the pump either directly from its shipping container (e.g., a truck, a railcar, a barge, or the like) or from a transport pipeline. In either case, the treatment fluid may be drawn into the pump, elevated to an appropriate pressure, and then introduced into the transporting conduit for delivery downhole.

When desired for use, the nanoporous metal oxide may be added to the aqueous base fluid to provide the treatment fluid. In alternative examples, the aqueous base fluid may be added to the nanoporous metal oxide to provide the treatment fluid. The treatment fluid may be introduced into a wellbore to perform a wellbore operation, for example, drilling, displacement, etc. Should any portion of the treatment fluid remain in the wellbore annulus, increasing pressure in the annulus may induce the water molecules to enter into the interior volume of the nanoporous metal oxide resulting in a reduction in fluid volume of the treatment fluid remaining in the annulus.

In some examples, the treatment fluid is a drilling fluid. The drilling fluid may include, for example, any number of fluids, such as solid suspensions, mixtures, and emulsions. The drilling fluid may be used to circulate drill cuttings to the surface where they may be removed. If any portion of the drilling fluid remains in the annulus, the nanoporous metal oxides may reduce the fluid volume of the remaining portion of drilling fluid as annular pressure increases.

As described herein, the treatment fluid may be a spacer fluid. The spacer fluid may be used to displace a first fluid (e.g., a drilling fluid) and prevent a second fluid (e.g., a cement composition) from contacting the first fluid. The spacer fluid may also displace the first fluid and/or filter cake solids from the wellbore in advance of the second fluid. Examples of the spacer fluid may improve the efficiency of the removal of these and other fluids from the wellbore. Removal of these fluids from the wellbore may enhance bonding of the second fluid (e.g., a cement composition) to surfaces in the wellbore.

In some examples, the displaced first fluid is a drilling fluid. The displaced drilling fluid may include, for example, any number of fluids, such as solid suspensions, mixtures, and emulsions. In some examples, the drilling fluid is an aqueous-based drilling fluid. In these examples, the aqueous-based drilling fluid may comprise nanoporous metal oxides. In some alternative examples, the aqueous-based drilling fluid may not comprise nanoporous metal oxides. In some other examples, the drilling fluid may comprise an oil-based drilling fluid. An example of a suitable oil-based drilling fluid comprises an invert emulsion. In some examples, the oil-based drilling fluid may comprise an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

In some examples, the second fluid is a cement composition. The cement composition introduced may comprise hydraulic cement and water. In some examples, kiln dust may be used in place of some (e.g., up to about 50% by weight or more) or all of the hydraulic cement. A variety of hydraulic cements may be utilized, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain examples, the hydraulic cement may comprise a Portland cement. In some examples, the Portland cements may include cements classified as Classes A, C, H, or G cements according to American Petroleum Institute, API Specification for Materials and Testing for Well Cements, API Specification 10, Fifth Ed., Jul. 1, 1990. In addition, in some examples, the hydraulic cement may include cements classified as ASTM Type I, II, or III.

Figure 2:
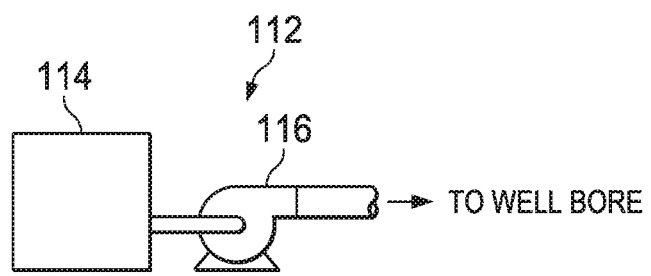
FIG. 2 is a schematic illustrating mixing and pumping equipment used in the preparation of a treatment fluid in accordance with the examples disclosed herein.

Referring now to FIG. 2, a schematic illustrating mixing and pumping equipment for the preparation of a treatment fluid comprising the nanoporous metal oxide is illustrated in accordance with the examples disclosed herein. FIG. 2 illustrates a system 112 for preparation of a treatment fluid comprising the nanoporous metal oxide. The nanoporous metal oxide may be added to an aqueous base fluid along with any treatment fluid additives and mixed in mixing equipment 114 to provide the treatment fluid. Mixing equipment 114 may be any mixer sufficient for mixing the components of the treatment fluid composition. Examples of mixing equipment 114 may include, but are not limited to, a jet mixer, re-circulating mixer, a batch mixer, and the like. In some examples, mixing equipment 114 may be a jet mixer and may continuously mix the treatment fluid as it is pumped to the wellbore. The nanoporous metal oxide may be added to mixing equipment 114 first or, alternatively, the aqueous base fluid may be added to mixing equipment 114 first. In some examples, the treatment fluid may be formulated in mixing equipment 114 such that the components of the treatment fluid, including the nanoporous metal oxide and the aqueous base fluid, may be added to the mixing equipment 114 in any order and mixed to provide the desired treatment fluid formulation.

After the treatment fluid has been mixed in mixing equipment 114, the treatment fluid may be pumped to the wellbore via pumping equipment 116. In some examples, the mixing equipment 114 and the pumping equipment 116 may be disposed on one or more cement trucks as will be apparent to those of ordinary skill in the art. Examples of pumping equipment 116 include, but are not limited to, floating piston pumps, positive displacement pumps, centrifugal pumps, peristaltic pumps, and diaphragm pumps.

Figure 3:
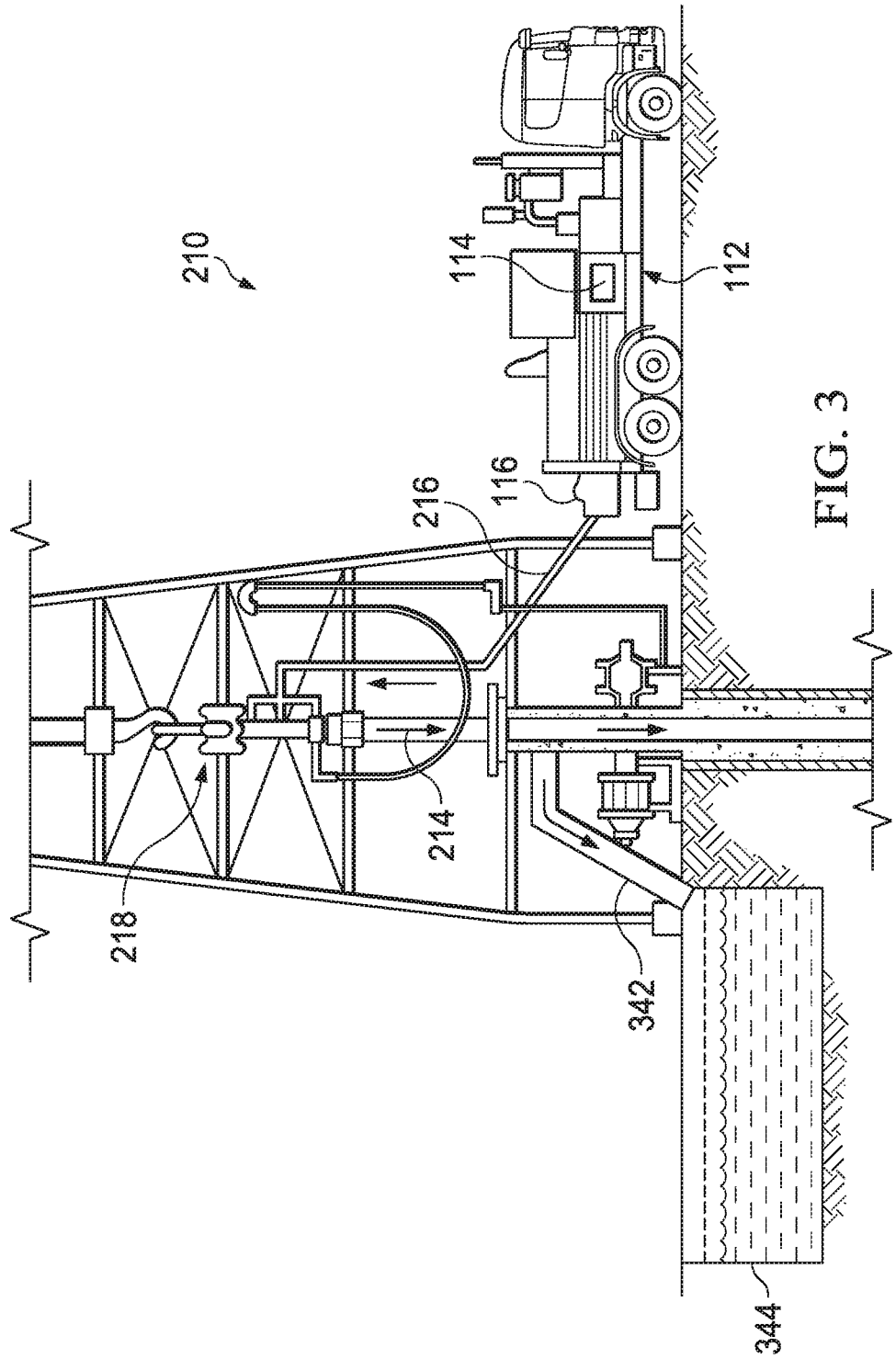
FIG. 3 is a schematic illustrating surface equipment used for the placement of a spacer fluid in accordance with the examples disclosed herein.

FIG. 3 is a schematic illustrating surface equipment 210 used for the placement of a spacer fluid 214 comprising a nanoporous metal oxide in accordance with the examples disclosed herein. It should be noted that while FIG. 3 generally depicts a land-based operation, those skilled in the art will readily recognize that the principles described herein are equally applicable to subsea operations that employ floating or sea-based platforms and rigs without departing from the scope of the disclosure. As illustrated, the surface equipment 210 may include a system 112 (described in FIG. 1 above). The system 112 may include mixing equipment 114 and pumping equipment 116 as will be apparent to those of ordinary skill in the art. The system 112 may pump the spacer fluid 14 through feed pipe 216 and to a cementing head 218, which conveys the spacer fluid 214 downhole into a wellbore. Any of the embodiments of a spacer fluid described herein may apply in the context of FIG. 3 with respect to the spacer fluid 214. For example, the spacer fluid 214 may comprise any of the nanoporous metal oxides described herein, and optionally, any of the treatment fluid additives described herein.

An example of using a spacer fluid 214 comprising a nanoporous metal oxide will now be described with reference to FIG. 4. Any of the examples of a spacer fluid described herein may apply in the context of FIG. 4 with respect to the spacer fluid 214. For example, the spacer fluid 214 may comprise any of the nanoporous metal oxides described herein, and optionally, any of the treatment fluid additives described herein.

Figure 4:
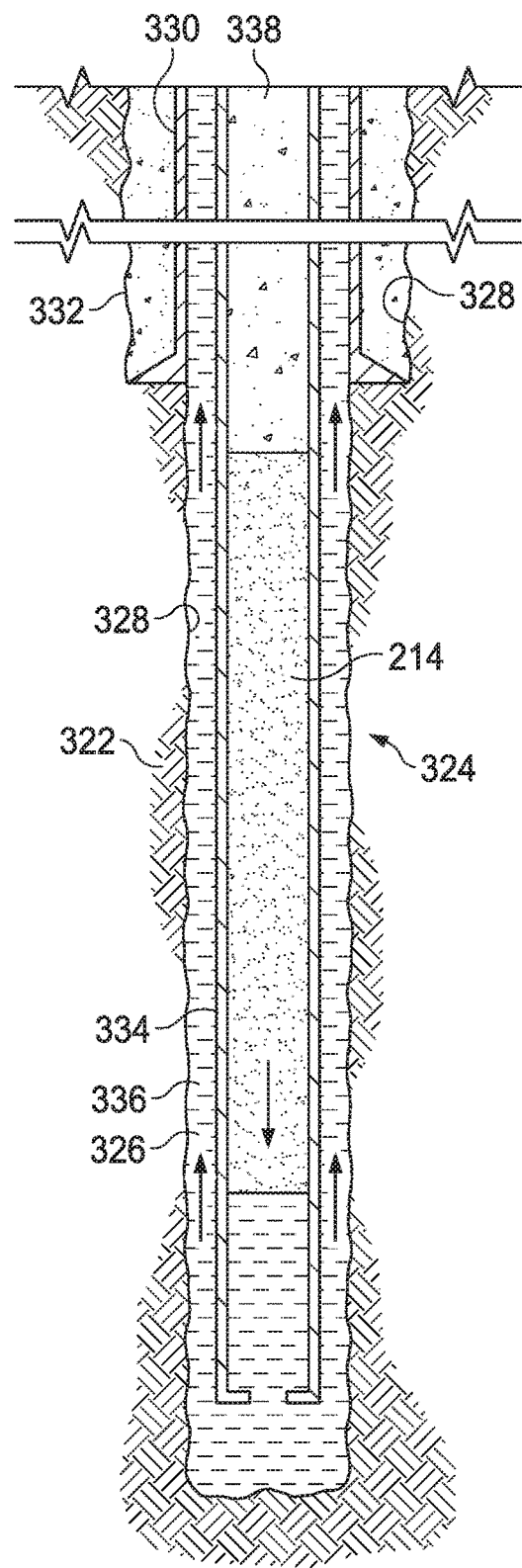
FIG. 4 is a cross-section illustrating the use of a spacer fluid to displace a first fluid from a wellbore annulus in accordance with the examples disclosed herein.

FIG. 4 is a cross-section illustrating the use of a spacer fluid 214 to displace a first fluid 326 from a wellbore annulus 336 in accordance with the examples disclosed herein. FIG. 4 depicts one or more subterranean formations 322 penetrated by a wellbore 324 with first fluid 326 (e.g., a drilling fluid) disposed therein. The first fluid 326 may comprise any of the drilling fluids disclosed herein as well as any other suitable well and/or treatment fluid that would be readily apparent to those of ordinary skill in the art. In some examples, the first fluid 326 may be a treatment fluid as described herein and my comprise a nanoporous metal oxide as described herein. While the wellbore 324 is shown extending generally vertically into the one or more subterranean formations 322, the principles described herein are also applicable to wellbores that extend at an angle through the one or more subterranean formations 322, such as horizontal and slanted wellbores. As illustrated, the wellbore 324 comprises walls 328. In the illustrated embodiment, a surface casing 330 has been cemented to the walls 328 of the wellbore 324 by cement sheath 332. In the illustrated embodiment, one or more additional pipe strings (e.g., intermediate casing, production casing, liners, etc.), shown here as casing 334, may also be disposed in the wellbore 324. As illustrated, there is a wellbore annulus 336 formed between the casing 334 and the walls 328 of the wellbore 324 (and/or the surface casing 330). While not shown, one or more centralizers may be attached to the surface casing 330, for example, to centralize the casing 334 in the wellbore 324 prior to and during any wellbore operations.

The spacer fluid 214 may be introduced into the wellbore 324 and used to separate the first fluid 326 from a second fluid 338 (discussed below). The previous examples referenced in FIGS. 2 and 3 for preparation and delivery of the spacer fluid 214 may be used for delivery of the spacer fluid 214 into the wellbore 324. Moreover, the pumping equipment 116 shown on FIGS. 2 and 3 may also be used for delivery of the spacer fluid 214 into the wellbore 324. The spacer fluid 214 may be used to displace the first fluid 326 from the wellbore 324 and to prepare the wellbore 324 for the second fluid 338. By way of example, the spacer fluid 214 may function, inter alia, to remove the first fluid 326 and/or filter cake solids from the wellbore 324 in advance of the second fluid 338. While not shown, one or more plugs or other suitable devices may be used to physically separate the first fluid 326 from the spacer fluid 214 and/or the spacer fluid 214 from the second fluid 338.

As illustrated, the second fluid 338 (e.g., a cement composition) may be introduced into the wellbore 324. For example, the second fluid 338 may be pumped down the interior of the casing 334. The pumping equipment 116 shown on FIGS. 2 and 3 may be used for delivery of the second fluid 338 into the wellbore 324. It may be desired to circulate the second fluid 338 in the wellbore 324 until it is in the wellbore annulus 336. The second fluid 338 may include any suitable treatment fluids that would be readily apparent to those of ordinary skill in the art. While not illustrated, other techniques may also be utilized for introduction of the second fluid 338, for example, reverse circulation techniques and the like.

Figure 5:
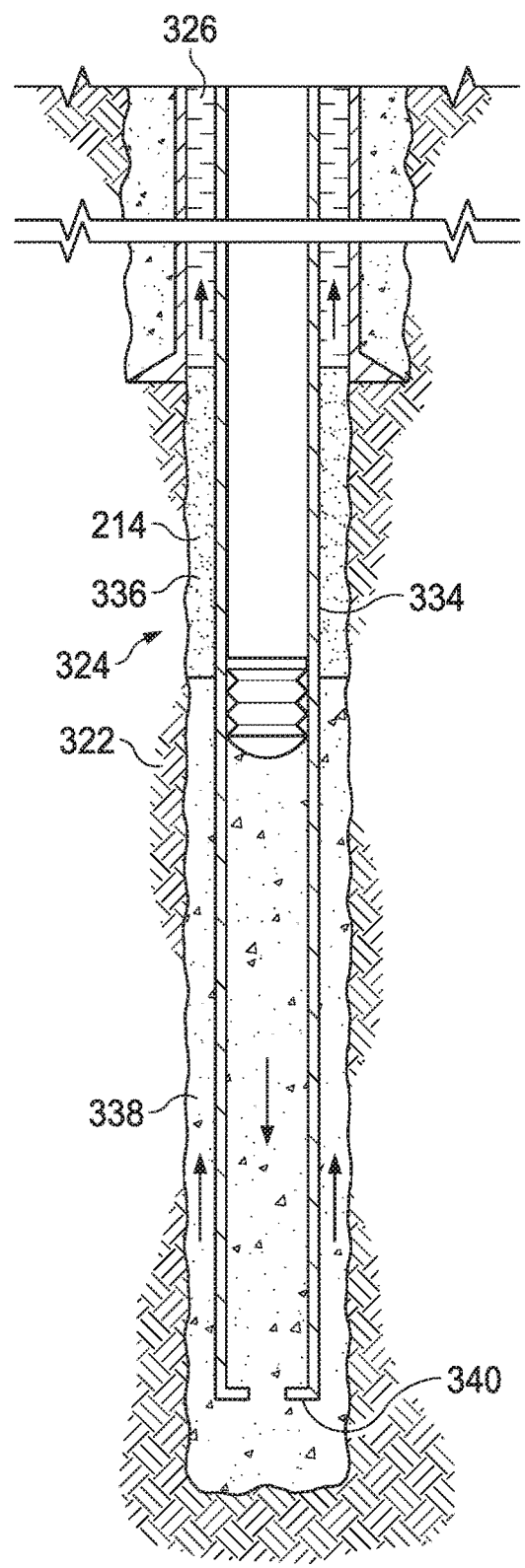
FIG. 5 is a cross-section further illustrating the displacement of a first fluid from the wellbore annulus using a spacer fluid in accordance with examples disclosed herein.

FIG. 5 is a cross-section further illustrating the displacement of a first fluid 326 from the wellbore annulus 336 using the spacer fluid 214 in accordance with examples disclosed herein. Referring now to FIG. 5, a portion of the first fluid 326 has been displaced from the wellbore annulus 336 in accordance with the described example of FIG. 4. As illustrated, the spacer fluid 214 and the second fluid 338 may be allowed to flow down the interior of the casing 334 through the bottom of the casing 334 (e.g., casing shoe 340) and up around the casing 334 into the wellbore annulus 336, thus displacing the first fluid 326. At least a portion of the displaced first fluid 326 may exit the wellbore annulus 336 via a flow line 342 and be deposited, for example, in one or more retention pits 344 (e.g., a mud pit), as shown in FIG. 3. Turning back to FIG. 5, the second fluid 338 may continue to be circulated until it has reached a desired location in the wellbore annulus 336. A portion of the spacer fluid 214 may become trapped in the wellbore annulus 336 above the top of the second fluid 338 and may be left in the wellbore annulus 336. As illustrated, the spacer fluid 214 may be disposed in the wellbore annulus 336 above or on top of the second fluid 338. In examples where the second fluid 338 is a cement composition, the second fluid 338 may set in the wellbore annulus 336 to form an annular sheath of hardened, substantially impermeable material (e.g., a cement sheath) that may support and position the casing 334 in the wellbore 324. As previously mentioned, examples of the spacer fluid 214 may remain in the wellbore annulus 336 throughout production. Produced oil and gas may transfer heat through the casing 334 and into the wellbore annulus 336. The increased temperature in wellbore annulus 336 may result in a buildup of annular pressure in wellbore annulus 336. The increase in annular pressure may induce a portion of the water molecules within the aqueous base fluid of the spacer fluid 214 to enter into the interior volume of the nanoporous metal oxides within the spacer fluid 214. This inflow of water molecules into the nanoporous metal oxide results in a reduction of fluid volume for the spacer fluid 214 which may mitigate the described annular pressure buildup occurring from increasing annular pressure within wellbore annulus 336. As the annulus comprises an annular pressure, the overall annular pressure may thus be reduced to be less than a casing collapse pressure of a casing adjacent to the annulus after the fluid volume of the spacer fluid 214 has been reduced by a portion of the spacer fluid 214 entering into the interior volume of the nanoporous metal oxide. This reduction in annular pressure resulting from the reduction in fluid volume of the spacer fluid 214 may assist in maintaining the casing and well integrity during production, enhancement, or shut-in.

The treatment fluids described herein may be of particular benefit in wells that undergo repeated heating cycles, for example, geothermal wells. Additionally, some wells may be subject to repeated production enhancement, for example, in thermal recovery operations such as cyclic steam injection, etc. Cyclic heating techniques allow the nanoporous metal oxide to repeatedly mitigate annular pressure buildup. In these examples, there may not be a need for other mitigation practices, as the nanoporous metal oxide reversibly absorbs and desorbs as described above. As such, the systems disclosed herein may further comprise equipment for thermal recovery operations and/or equipment for cyclic steam injection. Although wells undergoing cyclic heating operations may particularly benefit from the methods disclosed herein, wells undergoing a single heating operation where the annular pressure may be permanently raised or otherwise not increased further may also benefit from the methods described herein, for example, shut-in wells or wells on production with a closed annulus.

It should be clearly understood that the examples illustrated by FIGS. 1-5 are merely general applications of the principles of this disclosure in practice, and a wide variety of other examples are possible. Therefore, the scope of this disclosure is not limited in any manner to the details of FIGS. 1-5 described herein.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-5.

Provided are methods for mitigating annular pressure buildup in a wellbore in accordance with the disclosure and the illustrated FIGS. An example method comprises introducing a treatment fluid into an annulus of the wellbore, wherein the annulus has an annular pressure, wherein the treatment fluid comprises an aqueous base fluid and a nanoporous metal oxide; allowing or causing to allow at least a portion of the treatment fluid to remain in the annulus; and allowing or causing to allow the annular pressure to increase thereby inducing at least a portion of the aqueous base fluid to enter into an interior volume of the nanoporous metal oxide.

Additionally or alternatively, the method may include one or more of the following features individually or in combination. The nanoporous metal oxide may be a zeolite. The nanoporous metal oxide may be a metal organic framework. The nanoporous metal oxide may comprise a pore size of about 0.2 to about 2 nm. The nanoporous metal oxide may be present in the treatment fluid in a concentration of about 0.01 wt. % to about 20 wt. %. The method may further comprise displacing a first fluid present in the wellbore with the treatment fluid. The method may further comprise introducing a second fluid after the treatment fluid is introduced into the wellbore. The method may further comprise drilling the wellbore with the treatment fluid. The method may further comprise allowing or causing to allow the annular pressure to decrease thereby inducing at least a portion of the aqueous base fluid to exit the interior volume of the nanoporous metal oxide. The method may further comprise allowing or causing to allow the annular pressure to decrease thereby inducing at least a portion of the aqueous base fluid to exit the interior volume of the nanoporous metal oxide, and repeating the allowing or causing to allow the annular pressure to increase thereby inducing at least a portion of the aqueous base fluid to enter into the interior volume of the nanoporous metal oxide. The annular pressure may be less than a casing collapse pressure of a casing adjacent to the annulus after the portion of the aqueous base fluid has entered into the interior volume of the nanoporous metal oxide.

Provided are spacer fluid compositions which may be used to mitigate annular pressure buildup in a wellbore. An example spacer fluid composition comprises an aqueous base fluid, and a nanoporous metal oxide.

Additionally or alternatively, the spacer fluid composition may include one or more of the following features individually or in combination. The nanoporous metal oxide may be a zeolite. The nanoporous metal oxide may be a metal organic framework. The nanoporous metal oxide may comprise a pore size of about 0.2 to about 2 nm. The nanoporous metal oxide may be present in the treatment fluid in a concentration of about 0.01 wt. % to about 20 wt. %.

Provided are systems for mitigating annular pressure buildup in a wellbore. An example system comprises a treatment fluid comprising: an aqueous base fluid and a nanoporous metal oxide; mixing equipment capable of mixing the aqueous base fluid and nanoporous metal oxide to provide the treatment fluid; and pumping equipment capable of delivering the treatment fluid into an annulus of a wellbore.

Additionally or alternatively, the spacer fluid composition may include one or more of the following features individually or in combination. The nanoporous metal oxide may be a zeolite. The nanoporous metal oxide may be a metal organic framework. The nanoporous metal oxide may comprise a pore size of about 0.2 to about 2 nm. The nanoporous metal oxide may be present in the treatment fluid in a concentration of about 0.01 wt. % to about 20 wt. %. The wellbore may be a wellbore for a geothermal well. The wellbore may be shut-in. The system may further comprise cyclic steam injection equipment capable of injecting steam into the wellbore in cycles.

EXAMPLES

The present disclosure may be better understood by reference to the following examples, which are offered by way of illustration. The present disclosure is not limited to the examples provided herein.

Example 1

Example 1 illustrates a proof-of-concept experiment to test the absorption capacity of two spacer fluid examples prepared as described herein. The first spacer fluid example comprised an aqueous base fluid and the ZSM-5 zeolite. The composition of the spacer fluid is illustrated in Table 1 below.

TABLE 1

| Component | Amount (g) | Weight % | Specific Gravity | Volume (gal) |
|---|---|---|---|---|
| ZSM-5 | 8148.1 | 0.05 | 2.2 | 1.0 |
| Water | 154813.4 | 0.95 | 0.998 | 41.0 |

The volume of fluid absorbed is zeolite specific. With the benefit of this disclosure, one of ordinary skill in the art will be readily able to determine the fluid absorption capacity for a specific zeolite. Starting with a potential absorption capacity for ZSM-5 of 0.30 mL/g. (note that volume of fluid absorbed shifts with the pressure applied as described above), to calculate the decrease in spacer fluid volume at that absorption capacity, the amount of zeolite is multiplied by the water absorption capacity—8148.1 g ZSM-5×0.30 mL/g=2444.4 mL or 0.65 gallons of fluid absorbed by ZSM-5. This is a 1.5% decrease in the fluid volume of the spacer fluid.

The second spacer fluid example comprised an aqueous base fluid and the MFI-50 zeolite. The composition of the spacer fluid is illustrated in Table 2 below.

TABLE 2

| Component | Amount (g) | Weight % | Specific Gravity | Volume (gal) |
|---|---|---|---|---|
| MFI-50 | 8148.1 | 0.05 | 2.2 | 1.0 |
| Water | 154813.4 | 0.95 | 0.998 | 41.0 |

Starting with a potential absorption capacity for MFI-50 of 0.65 mL/g (note that volume of fluid absorbed shifts with the pressure applied as described above), to calculate the decrease in spacer fluid volume at that absorption capacity, the amount of zeolite is multiplied by the water absorption capacity—8148.1 g ZSM-5×0.65 mL/g=5296.3 mL or 1.40 gallons of fluid absorbed by MFI-50. This is a 3.3% decrease in the fluid volume of the spacer fluid.

Both of the illustrated examples describe a nanoporous metal oxide loading of 5 wt. %. This value may be increased or decreased as described above to provide a treatment fluid with the desired volume change potential for a wellbore application.

Example 2

Figure 6:
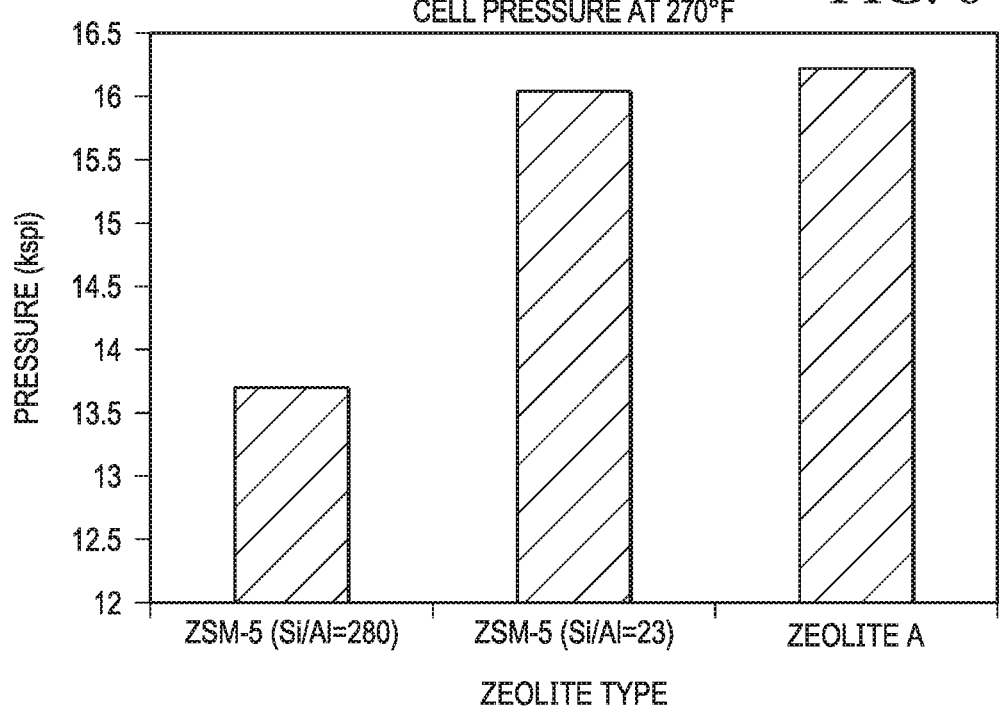
FIG. 6 is a graphical representation of a comparative experiment illustrating the pressure mitigating capabilities of various zeolite species in accordance with examples disclosed herein.

Example 2 illustrates a comparison of the absorption capacity of various zeolite species under increasing pressure. Three zeolite species were compared: ZSM-5 (Si/Al=280), ZSM-5 (Si/Al=23), and Zeolite A. ZSM-5 (Si/Al=280) is a ZSM-5 framework with a Si/Al mole ratio of 280/1. ZSM-5 (Si/Al=23) is a ZSM-5 framework with a Si/Al mole ratio of 23/1. Zeolite A exhibits a Linde Type A structure with a Si/Al mole ratio of 1. The zeolites were placed into a vacuum oven at a temperature of 120° F. and a pressure of −30 psi for approximately three days. The zeolites were then removed and placed into a pressure cell. The pressure cell was filled with 15 g of each zeolite species as well as 210 g of water. The pressure cell was then sealed and the temperature of the pressure cell was set to ramp from 80° F. to 270° F. in 1 hour. The pressure of the pressure cell was measured during this time. FIG. 6 is a graphical representation of the maximum pressure readings at the 270° F. temperature.

As illustrated, zeolite species ZSM-5 (Si/Al=23) and Zeolite A have a similar pressure response to the temperature increase. ZSM-5 (Si/Al=280) shows a lower pressure build under the same conditions.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of mitigating annular pressure buildup in a wellbore, the method comprising:
    introducing a treatment fluid into an annulus of the wellbore, wherein the annulus has an annular pressure, wherein the treatment fluid comprises an aqueous base fluid and a nanoporous metal oxide having a pore size in a range of between about 0.2 nm to about 1000 nm;
    allowing or causing to allow at least a portion of the treatment fluid to remain in the annulus; and
    allowing or causing to allow the annular pressure to increase thereby inducing at least a portion of the aqueous base fluid to enter into an interior volume of the nanoporous metal oxide.

2. The method of claim 1, wherein the nanoporous metal oxide is a zeolite.

3. The method of claim 1, wherein the nanoporous metal oxide is a metal organic framework.

4. The method of claim 1, wherein the nanoporous metal oxide comprises a pore size of about 0.2 to about 2 nm.

5. The method of claim 1, wherein the nanoporous metal oxide is present in the treatment fluid in a concentration of about 0.01 wt. % to about 20 wt. %.

6. The method of claim 1, further comprising displacing a first fluid present in the wellbore with the treatment fluid.

7. The method of claim 6, further comprising introducing a second fluid after the treatment fluid is introduced into the wellbore.

8. The method of claim 1, further comprising drilling the wellbore with the treatment fluid.

9. The method of claim 1, further comprising allowing or causing to allow the annular pressure to decrease thereby inducing at least a portion of the aqueous base fluid to exit the interior volume of the nanoporous metal oxide.

10. The method of claim 1, further comprising allowing or causing to allow the annular pressure to decrease thereby inducing at least a portion of the aqueous base fluid to exit the interior volume of the nanoporous metal oxide, and
    repeating the allowing or causing to allow the annular pressure to increase thereby inducing at least a portion of the aqueous base fluid to enter into the interior volume of the nanoporous metal oxide.

11. The method of claim 1, wherein the annular pressure is less than a casing collapse pressure of a casing adjacent to the annulus after the portion of the aqueous base fluid has entered into the interior volume of the nanoporous metal oxide.

12. A spacer fluid comprising:
    an aqueous base fluid, and
    a nanoporous metal oxide having a pore size in a range of between about 0.2 nm to about 1000 nm; wherein the nanoporous metal oxide is configured to reversibly contain a portion of the aqueous base fluid as a fluid pressure of the aqueous base fluid increases and to reversibly release a portion of the aqueous base fluid from inside itself as the fluid pressure of the aqueous base fluid decreases.

13. The spacer fluid of claim 12, wherein the nanoporous metal oxide is a zeolite.

14. The spacer fluid of claim 12, wherein the nanoporous metal oxide is a metal organic framework.

15. The spacer fluid of claim 12, wherein the nanoporous metal oxide comprises a pore size of about 0.2 to about 2 nm.

16. The spacer fluid of claim 12, wherein the nanoporous metal oxide is present in the treatment fluid in a concentration of about 0.01 wt. % to about 20 wt. %.

17. A system for mitigating annular pressure buildup in a wellbore; the system comprising:
    a treatment fluid comprising:
        an aqueous base fluid, and
        a nanoporous metal oxide having a pore size in a range of between about 0.2 nm to about 1000 nm;
    mixing equipment capable of mixing the aqueous base fluid and nanoporous metal oxide to provide the treatment fluid; and
    pumping equipment capable of delivering the treatment fluid into an annulus of a wellbore.

18. The system of claim 17, wherein the wellbore is a wellbore for a geothermal well.

19. The system of claim 17, wherein the wellbore is shut-in.

20. The system of claim 17, further comprising cyclic steam injection equipment capable of injecting steam into the wellbore in cycles.

* * * * *